Nov. 23, 1943.       M. J. DE MASK         2,334,810
POWER DISTRIBUTION SYSTEM
Filed July 12, 1935          2 Sheets-Sheet 1
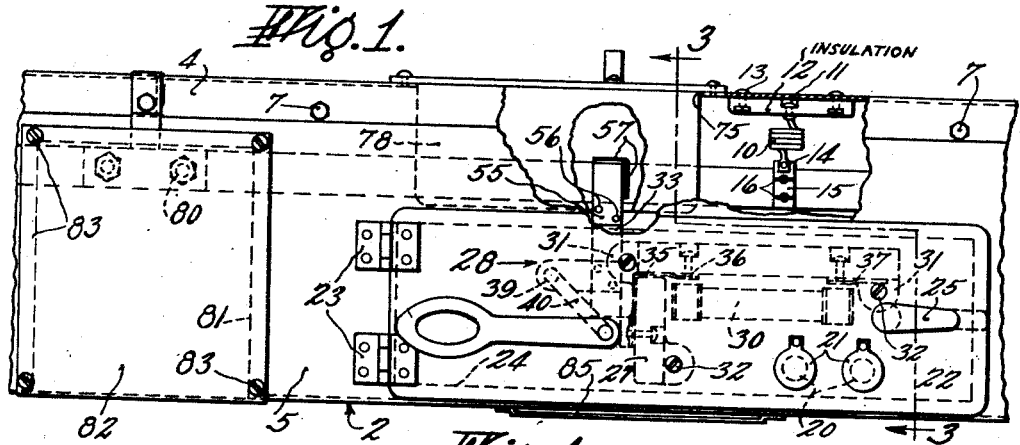
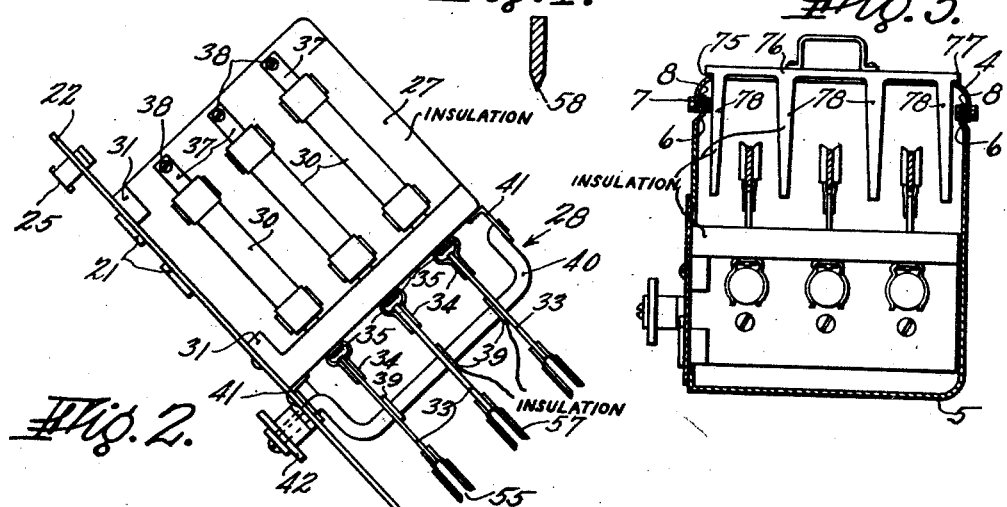
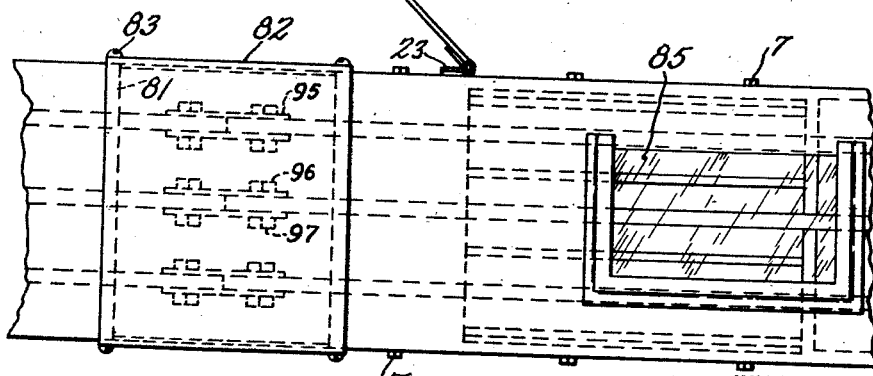
INVENTOR
*Martin J. De Mask*
BY
*Chapin & Neal*
ATTORNEYS

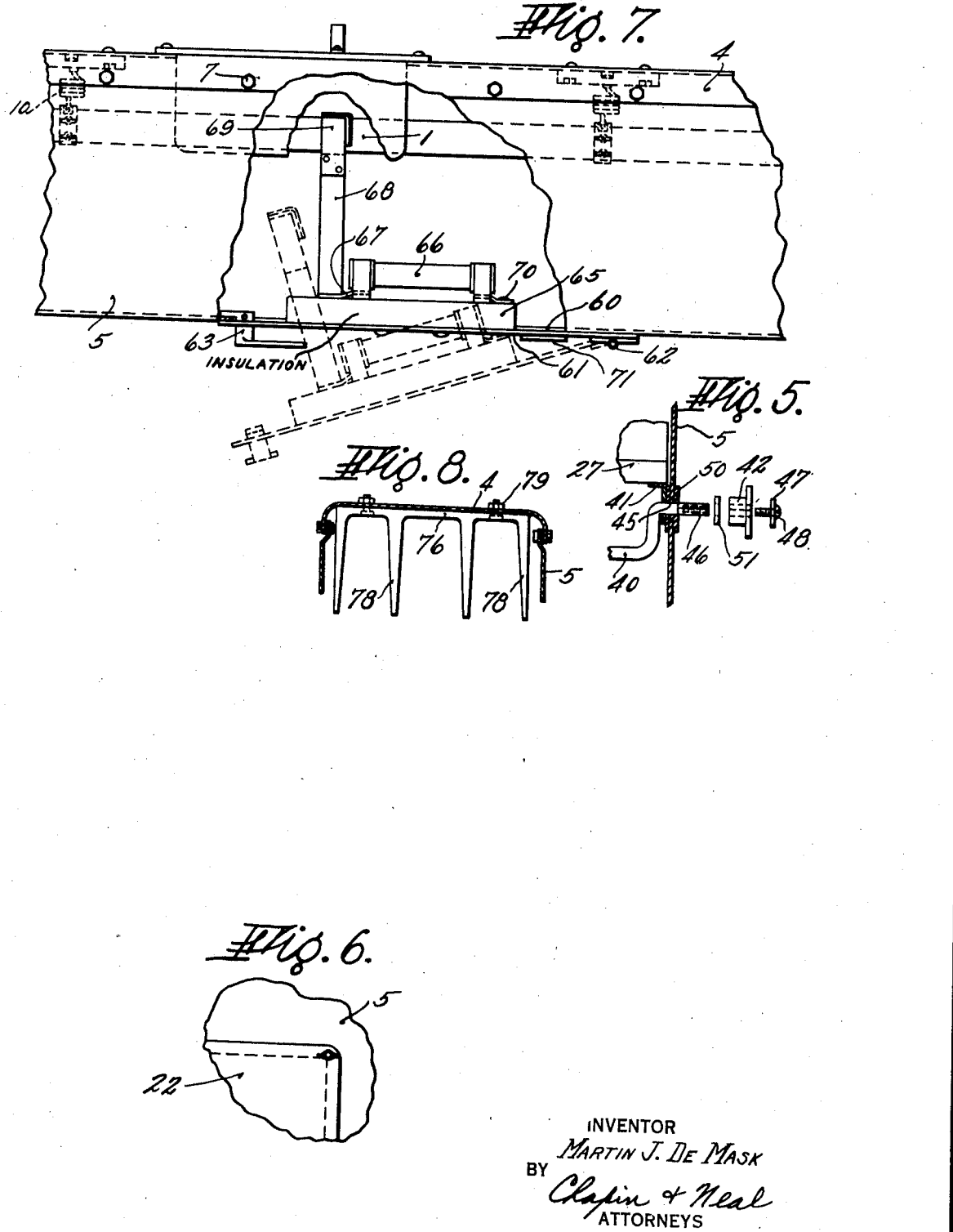

Patented Nov. 23, 1943

2,334,810

UNITED STATES PATENT OFFICE 2,334,810

POWER DISTRIBUTION SYSTEM

Martin J. De Mask, Pittsfield, Mass., assignor to The Trumbull Electric Manufacturing Company, Plainville, Conn., a corporation of Connecticut Application July 12, 1935, Serial No. 30,956

5 Claims. (Cl. 200—114)

This invention relates to systems for distributing electric power, more particularly to systems in which rigid bus bars are employed as the main conductors, from which power take-off leads are taken off as desired.

Among the objects of my invention are the provision of improved suspension means for the bus bars and an improved form of duct for enclosing the bus bars.

Other objects residing in more efficient assembly features made possible by the general arrangement, improvements in desired switch assemblies and greater safety of operation will be apparent from the following specification and claims.

In the accompanying drawings,

Fig. 1 is a side elevational view of a portion of a power installation according to my invention, the parts being shown in operative position and portions being broken away for clearness of disclosure;

Fig. 2 is a bottom view of the structure shown in Fig. 1, the switch assembly being shown in inoperative position;

Fig. 3 is a sectional view substantially on line 3—3 of Fig. 1;

Fig. 4 is a detail sectional view of one of the bus bars showing a modification of its form at the point of contact of the switch blades;

Fig. 5 is a fragmentary view partly in section showing an alternative arrangement of the switch operating means;

Fig. 6 is a fragmentary view showing an alternative manner of securing the closure, by which the switch mounting is supported, to the duct opening;

Fig. 7 is a view similar to Fig. 1 showing a modified form of switch arrangement;

Fig. 8 is a sectional view showing a modified form of the barriers.

Referring to the drawings, substantially rigid bus bars, indicated at 1, are shown as extending longitudinally of a duct 2. In the drawings the bus bars are shown as three in number but it will be understood that the number of bus bars may be varied as required.

The duct, as best shown in Figs. 1 and 3, is usually made up of lengths joined end to end by being overlapped and bolted as shown in Fig. 1, each length comprising a shallow channel member 4 from which the bus bars are supported as later described and a mating channel member 5 of greater depth than member 4. The edges of member 5 are bent inwardly as at 6 for insertion into underlapping relation with the edges of member 4 and the parts are held together at suitable intervals by bolts 7 or other suitable means. Gaskets 8 may be positioned between the overlapped portion of the duct members, if desired, to render the joint fluid-tight. By the arrangement just described the installation of the power system is greatly simplified since the mounting, splicing, repair, and other installation and servicing operations are facilitated by the freedom of access to the bus bars afforded before member 5 is put in place or by its removal. A further advantage of the structure resides in the fact that after installation if changed conditions require bus bars of greater or less size and capacity the desired change can easily be made without changing the supporting member 4 which is secured to a wall or ceiling so as to be stationary, and members 5 of greater or less depth may be similarly substituted to meet changed needs with respect to the capacity of the duct.

The bus bars are supported at suitable intervals from member 4 by means of spring hangers, shown as comprising a coiled spring 10 having one end flattened and riveted or bolted, as indicated at 11, to an insulating base 12, secured to member 4 by bolts 13 or other suitable means. The opposite end of the spring is flattened and riveted or otherwise secured at 14 to a flat metal strip 15 which is preferably attached by means of bolts, provided with wing nuts 16, to the bus bars. In ordinary practice the bus bars are formed of copper while the duct is made of steel. In consequence there is a difference in the degree of expansion under changes of temperature between the bar and the duct which tends to buckle one or both or to loosen the bolts or other securing means by which the various parts are held together. The springs 10 which are sufficiently stiff to resist, while cushioning, the normal strains to which they are subjected, yield sufficiently to accommodate the differences in expansion of the various parts.

Power take-off leads may be connected to the bus bars through conventional "knock out" openings formed at various intervals along one or more sides of member 5. It is often advantageous to connect such power take-off leads to the bus bars by means of a switch device with which fuses or other circuit interrupting means may if desired be associated. The duct structure above described is particularly adapted to specific arrangements of the mounting for such switches or similar mechanisms and while, as will be later obvious, these arrangements possess their own utility, some of the more specific advantages of my invention result from the combination of the switch mounting arrangements with the duct structure and manner of supporting the bus bars above described.

Referring to Figs. 1, 2 and 3, the power take-off openings 20, shown as provided with pivoted, sidewise movable covers 21, but which might be of the conventional "knock out" type, are formed in a plate 22 hinged at 23 to the duct member 5 and adapted to close an opening 24 of desired size and shape formed at desired intervals in said member. A latch 25 is provided to releasably lock plate 22 in closed position. Secured to, or formed integral with the plate 22 is an insulating block 27 forming a support for a switch mechanism 28 and circuit interrupting means, such as fuses 30. It will be seen that plate 22 lies closely to the exterior of the duct and that the external contour of the duct is substantially maintained by the outer surface of plate 22. As shown, block 27 is formed with threaded lugs 31 to receive screws 32 passing through plate 22 and securing the block rigidly to the inner face of the plate. The specific structure of the switch operating mechanism does not form a part of the present invention. The switch shown comprises one or more blades 33, one for each bus bar to which connection is desired, held firmly at 34 between spring jaws 35 to which are attached conductive strips which pass through suitable openings in the block for connection at 36 to one terminal of the associated fuse 30. The other terminals of the fuses are connected to conducting strips 37 provided with any suitable means 38 for connection with the power take-off leads, not shown. In some instances it may be desirable to omit the stem of the insulating block 27, in which case the power take off leads would be connected to the conductors on the head of the block 27. The blades 33 are secured by means of arms 39, formed of insulating material, to an actuating crank shaft 40 and are integrally movable therewith. The ends of shaft 40 are journaled in brackets 41 secured to block 27 and axially aligned with said jaws 35, and are provided at one or both ends with an operating handle 42 or other means by which the switch may be operated from the outside of the duct. As shown in Fig. 2 the end of shaft 40 extends through a suitable opening in plate 22, the extending portion being provided with a squared end on which the handle 42 which is provided with a corresponding squared opening, is mounted and held in place by a washer of greater diameter than the squared end, and a screw tapped into the end of the shaft. This structure is shown in more detail in Fig. 5, which shows the arrangement when the operating handle is placed on the end of the shaft opposite plate 22. In the latter figure, the wall of the channel member 5 is provided with an opening 45 through which the end of shaft 40 is projected as the plate 22 is swung to closed position. The squared end of the shaft 40 is shown at 46, the switch operating handle at 42 and the retaining washer and screw at 47 and 48, respectively. The handle is placed in position after the plate 22 has been closed and thus serves to hold the plate closed and prevents unintentional or careless opening of the plate.

It is sometimes desirable to make the duct fluid-tight and one manner of sealing the opening 45 is shown in Fig. 5 where an annular rubber bushing 50 is engaged over the edges of the opening. The diameter of the opening in the bushing is made slightly less than the diameter of shaft 40 so that the bushing tightly engages the shaft and the tightness of the fit is increased by transversely compressing the bushing between adjacent bracket 41 and a washer 51 when the handle 42 is tightly secured. It will be understood that other means of gasketing the opening 45, as well as the corresponding opening for the shaft where it passes through plate 22 in Fig. 2, may be employed, or the gasketing may be omitted when the character of the installation does not require it.

Referring again to Figs. 1 and 2, the switch blades 33 are provided with spring contact clips which engage the bus bars between them. These clips as shown comprise spring members 55 riveted as at 56 to the ends of the blades. Members 55 are provided with outwardly flaring lips 57 to facilitate engagement of the clips with the bars. This engagement may be further facilitated if desired by beveling the edges of the bars as indicated in Fig. 4 at 58. In some cases it may be desirable to position the contact clips on the bars instead of on the blades in which case any of the clip structures shown in my Patent No. 2,098,414 dated November 9, 1937, may be used.

By securing the switch or other control mechanism to the hinged closure plate 22 correct positioning of the mechanism with respect to the bus bars is always assured and when the mechanism is swung from the duct the operator has both hands free to renew the fuses, clean the contacts or perform other servicing operations. A further advantage is that the switch must be moved to circuit opening position before the mechanism can be made accessible thus preventing accidents and short circuiting through careless attempts at making repairs or adjustment while the switch or other mechanism is in the duct. It will be understood that these advantages are not limited to the specific arrangement shown in Figs. 1 and 2. An alternative form is shown in Fig. 7 where the opening 60 is shown in that face of member 5 opposite member 4. A plate 61 is hinged to member 5 as at 62 to be swung into position to close opening 60, a latch 63, similar to latch 25, being provided to releasably hold the plate in closed position. An insulating block 65 is secured to the inner face of plate 61, or is formed integral therewith. Block 65 is shown as carrying circuit interrupting means such as fuse 66, one terminal of which is connected by conductor 67 to a rigid contact blade 68 secured to block 65 and provided at its free end with a contact clip 69, similar to those shown in Figs. 1 and 2, adapted to engage the bus bar 1 when the plate 61 is in closed position. Power take-off leads not shown may be connected to terminal 70 of the fuse, through suitable openings having covers 71 similar to 21 in Fig. 1. As will be evident the electrical connection of blade 68 with the bus bar is made and broken by the act of moving plate 61 to closed or open position. It will be understood that a blade and fuse would normally be provided for each bus bar in the duct, but that the number and arrangement of the conductors and the mechanisms carried by plate 61 will be varied to meet desired conditions.

Where the mechanism carried by the plates 22 (or 61) is of a character which is replaceable, rather than requiring service or adjustment, or where servicing or adjusting is not easily carried out while the parts are in position, the plates instead of being hinged may be releasably held to the duct by wing nuts as shown at 73 in Fig. 6. It will, of course, be understood that gaskets may be provided between the plate 22 or 61 and the walls of the duct, or at any other point where it is desirable to seal the duct system.

In some cases, particularly when currents at relatively high voltages are being carried, it is desirable to provide barriers of insulation between the bars at the point where the blades make contact with the bars. Such barriers have in the past been provided as permanent parts of the duct structure, an arrangement which has added to the expense of manufacture and installation costs, and prevented easy changes to meet changed conditions. To maintain the flexibility of use which is afforded by the duct and power distributing structures above described, I provide barriers which may be put in place at the switch position as a unit without disturbing the duct, bus bar hangers or their support and without interfering with the switch mechanism. As best shown in Figs. 1 and 3 I provide a hand hole 75 in member 4 of the duct at a point overlying the portion of the bus bars with which the switch blades, or other electrical contact means of the mechanism carried by plate 22 (or plate 61), come in contact. Through opening 75 is inserted a block of insulating material 76 having flanges 77 which rest on the edge portions of the opening 75 to support the block. The under side of the block is provided with a plurality of insulating barriers 78 which extend downwardly between and past the bus bars 1, thus preventing arcing between the bars when the switch members are moved into and out of contact. The opening 75 may be closed by a conventional cover plate when barriers are not needed. If preferred the barrier block could be secured to the inside of a conventional metal cover plate or as shown in Fig. 8 the block could be secured to the inside of member 4 by nuts 79 or other suitable securing means.

It is many times desirable to provide for access to the bus bars at various points such for example as the point where lengths of bars are spliced together, as indicated at 80, by means of the plates 95, which are held in position by the bolts 96, and nuts 97, and the present duct structure makes such access possible in an advantageous manner. As shown in Figs. 1 and 2 the duct member 5 is cut away preferably at the end of each length as at 81, the opening preferably extending to above the bus bars. This opening is closed by a single U-shaped member 82, which overlaps the edges of the opening 81 and which is held in place by screws 83. Removal of member 82 affords complete unobstructed access to three sides of the bus bars, for inspection or service.

For convenience in inspecting the switch or other mechanism carried by the plate 22, a glazed opening 85 may be provided in member 5.

I claim:

1. In apparatus of the character described, a duct having spaced walls, bus bar runs disposed within said duct, one of said walls being provided with an aperture, a plate hinged to the duct at the aperture and forming a continuation of said wall and substantially closing said aperture, an insulating base fastened to the inside of said plate and lying substantially completely within said duct, conducting means mounted on said insulating base and lying completely within the duct, said conducting means including contact elements adapted to be moved into, or out of, electrical contact with the bus bar runs, and means connected to the said contact elements and extending through the said plate and accessible for manipulation from the opposite side of said plate whereby the said contact elements may be moved into, or out of, electrical contact with said bus bar runs without disturbing said plate.

2. In apparatus of the character described, a duct having spaced walls, bus bar runs disposed within said duct, one of said walls being provided with an aperture, a closure attachable to said duct at the aperture and forming part of said wall, knock-outs in said closure, conducting means mounted on the inside of said closure and lying completely within said duct, said conducting means including contact blades adapted to be moved into, or out of, electrical contact with said bus bar runs, and means connected to said contact blades and extending through said closure and accessible for manipulation from the opposite side of said closure whereby said contact blades may be moved into, or out of, electrical contact with said bus runs when said closure is in closed position relative to said aperture.

3. In apparatus of the character described, a duct the external contour of which is uniform substantially throughout its length, one wall of said duct being provided with an aperture, conductors within said duct, a movable closure for said aperture, contact means mounted on said closure and adapted for electrical engagement with said conductors, mechanism on said closure for making and breaking said engagement, said closure being constructed and arranged for swinging movement to open, or to close said aperture and being a substantial continuation, exteriorly, of the external contour of said wall when in closed position over said aperture.

4. In apparatus of the character described, a duct having spaced walls, bus bar runs disposed within said duct, one of said walls being provided with an aperture, a hinged plate for closing said aperture and forming part of said wall, conducting means mounted on the inside of said closure plate and lying completely within said duct, said conducting means including contact blades adapted to be moved into, or out of, electrical contact with said bus bar runs, and means connected to said contact blades and extending through said closure plate and accessible for manipulation from the opposite side of said plate whereby said contact blades may be moved into, or out of, electrical contact with said bus bars when said plate is in closed position relative to said aperture, the relative arrangement of such means and blades being such that the blades must be moved out of electrical contact with the bus runs in order to move the plate to open position.

5. A bus bar duct system including housing means comprising top, bottom and side walls, bus bars located between the side walls, one of the side walls having an opening, a closure plate for the opening hinged to the side wall and carrying a switching device hinged to the closure plate and having an external operating lever, said switching device being movable to engage the bus bars when the closure plate is closed, said switching device preventing the opening of the closure plate when the circuit is closed whereby it is necessary to open the circuit before the closure plate can be opened.

MARTIN J. DE MASK.